US007511975B2

(12) United States Patent
Hammond (10) Patent No.: US 7,511,975 B2
(45) Date of Patent: Mar. 31, 2009

(54) SYSTEM AND METHOD FOR LIMITING AC INRUSH CURRENT (75) Inventor: Peter Willard Hammond, Greensburg, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 299 days.

(21) Appl. No.: 11/507,006

(22) Filed: Aug. 18, 2006

(65) Prior Publication Data
US 2007/0064366 A1   Mar. 22, 2007

Related U.S. Application Data (60) Provisional application No. 60/709,392, filed on Aug. 18, 2005.

(51) Int. Cl.
    *H02M 1/36*   (2007.01)
(52) U.S. Cl. ............................. 363/49; 323/908; 363/50
(58) Field of Classification Search .................. 363/49, 363/51, 50; 323/908, 901; 361/58, 38
    See application file for complete search history.

(56) References Cited

U.S. PATENT DOCUMENTS

| 2,782,360 | A | * | 2/1957 | Kuzmack | 363/106 |
| 5,216,586 | A | * | 6/1993 | Saito | 363/49 |
| 5,479,086 | A | | 12/1995 | Konstanzer | |
| 5,625,545 | A | * | 4/1997 | Hammond | 363/71 |
| 5,834,924 | A | * | 11/1998 | Konopka et al. | 323/222 |
| 5,886,892 | A | | 3/1999 | Radley et al. | |
| 6,380,719 | B2 | * | 4/2002 | Underwood et al. | 322/36 |
| 6,426,885 | B1 | | 7/2002 | Sekiguchi et al. | |
| 6,829,556 | B2 | * | 12/2004 | Kumar | 702/132 |
| 7,092,262 | B2 | * | 8/2006 | Ryan et al. | 363/51 |
| 7,095,139 | B2 | | 8/2006 | Tsutada et al. | |
| 7,275,622 | B2 | * | 10/2007 | Hall et al. | 187/290 |

FOREIGN PATENT DOCUMENTS

| DE | 4309484 | 2/1994 |
| WO | WO02/45250 | 6/2002 |

OTHER PUBLICATIONS

PCT Search Report, mailed Nov. 28, 2006.

* cited by examiner

*Primary Examiner*—Akm E Ullah
*Assistant Examiner*—Harry Behm (57) ABSTRACT

A system for limiting AC inrush current to a power supply. The system comprises first, second, and third windings magnetically coupled to a core of a transformer of the power supply. The system also comprises a first low-voltage contactor and a second low-voltage contactor. The system further comprises a first low-voltage impedance element connected between the first low-voltage contactor and the first winding, a second low-voltage impedance element connected between the second low-voltage contactor and the first winding, a third low-voltage impedance element connected between the first low-voltage contactor and the second winding, and a fourth low-voltage impedance element connected between the second low-voltage contactor and the second winding.

20 Claims, 6 Drawing Sheets

SYSTEM AND METHOD FOR LIMITING AC INRUSH CURRENT

CROSS-REFERENCE TO RELATED APPLICATIONS

This application claims the priority benefit of U.S. Provisional Patent Application No. 60/709,392, filed on Aug. 18, 2005.

BACKGROUND

This application discloses an invention that is related, generally and in various embodiments, to a system and method for limiting AC inrush current when energizing a power supply.

For many power supplies, when power is suddenly applied to the input transformer of the power supply, the transformer is generally subjected to a substantial surge of current therethrough. This inrush current comprises a first component that is due to the charging of DC capacitors in the power supply, and a second component that is due to the saturation of the iron core of the transformer.

In general, secondary current only flows during the first cycle of inrush current, and the DC capacitors are fully charged at the end of the first cycle. The inrush current produces an overshoot of the DC voltage. Due to size and cost constraints, the number of DC capacitors that may be utilized to lessen the overshoot of DC voltage during inrush is limited. The overshoot in the DC capacitor voltage during inrush is due to energy stored in stray or deliberate inductance(s) at the large charging currents present during inrush. In general, the charging currents last for less than one cycle. The same capacitor charging currents are induced into the primary winding, reduced by the turns-ratio of the transformer.

In addition to the charging currents induced onto the primary winding from the secondary winding(s), there can be additional currents in the primary winding only due to saturation of the iron core. These saturation currents repeat over several subsequent cycles, even though the secondary charging currents are essentially zero after the first cycle. These multiple pulses of primary current stress the primary windings of the transformer, as well as the power distribution system. While the iron core is saturated, the inrush current is limited mainly by the self-inductance of the primary winding, so the inrush current can be very large. The peak primary currents are progressively diminished on each successive cycle, as the DC offset flux from the transient slowly decays, so that saturation occurs later in each cycle. However, the pulses of saturation current can last 20 cycles or more.

SUMMARY

In one general respect, this application discloses a system for limiting AC inrush current. According to various embodiments, the system comprises first, second, and third windings magnetically coupled to a core of a transformer of the power supply. The system also comprises a first low-voltage contactor and a second low-voltage contactor. The system further comprises a first low-voltage impedance element connected between the first low-voltage contactor and the first winding, a second low-voltage impedance element connected between the second low-voltage contactor and the first winding, a third low-voltage impedance element connected between the first low-voltage contactor and the second winding, and a fourth low-voltage impedance element connected between the second low-voltage contactor and the second winding.

In another general respect, this application discloses a method for limiting AC inrush current to a power supply. According to various embodiments, the method comprises charging capacitors of the power supply with low-voltage power delivered via windings magnetically coupled to a transformer of the power supply, magnetizing the transformer with low-voltage power delivered via the windings, and applying full voltage to the power supply after the capacitors are charged and the transformer is magnetized.

DESCRIPTION OF DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 1:
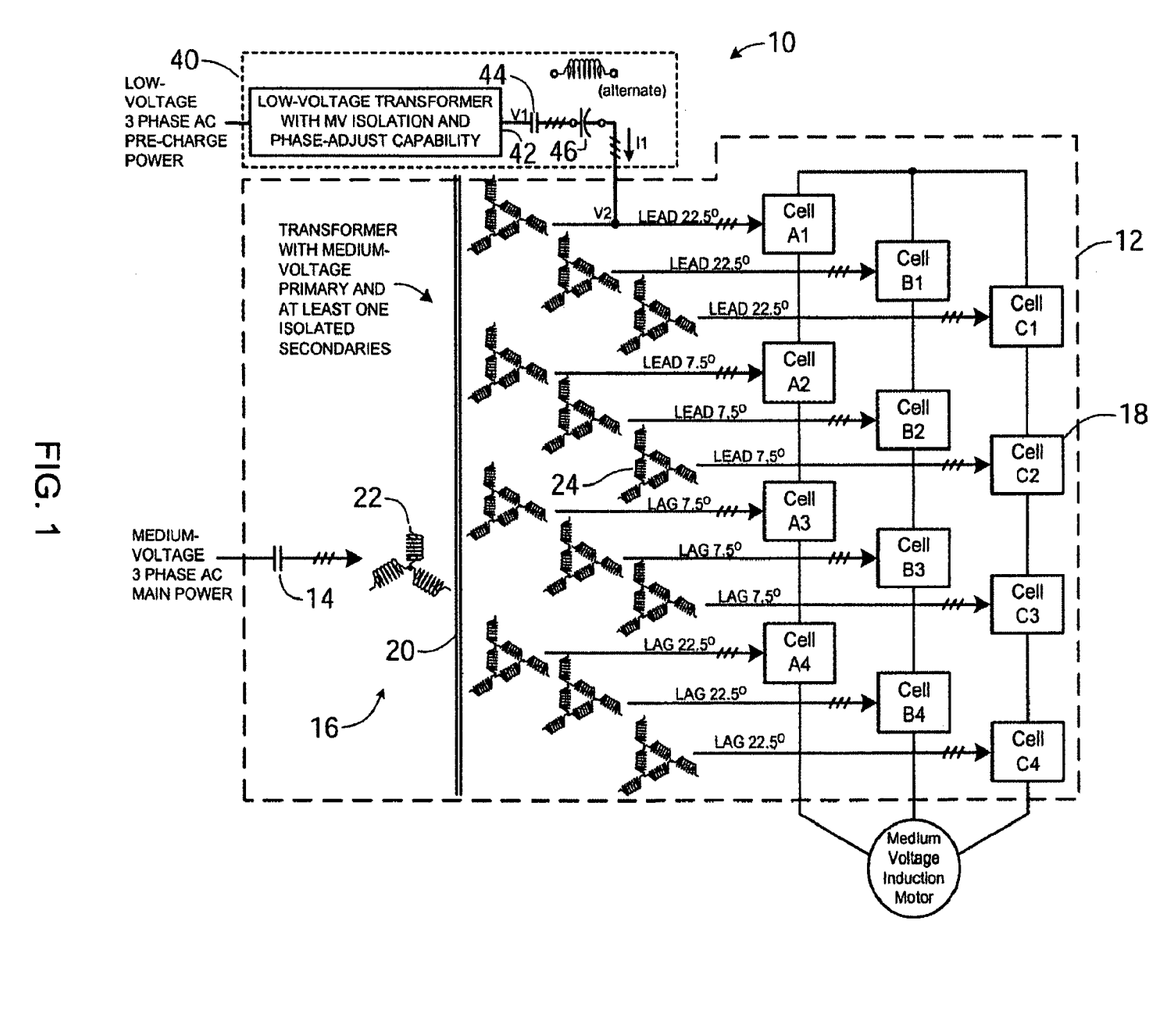
FIG. 1 illustrates various embodiments of a system for limiting AC inrush current to a power supply.

FIG. 1 illustrates various embodiments of a system 10 for limiting AC inrush current to a power supply 12. For purposes of clarity, portions of FIG. 1 are shown in a conventional one-line format. The power supply 12 may be, for example, a medium-voltage power supply, a high-voltage power supply, etc. As used herein, the terms low-voltage, medium-voltage and high-voltage are relative to one another, and each of the terms are meant to cover the general meanings recognized by those skilled in the art. For example, a medium-voltage may be considered to be over 600 volts, less than 69 kilovolts, etc. The power supply 12 generally comprises a main contactor 14, a transformer 16, and a power cell 18.

The main contactor 14 may be a three-phase contactor connected to three medium voltage power lines of a three-phase distribution system, and may comprise any number of auxiliary contacts as is known in the art. According to various embodiments, the main contactor 14 may be a vacuum contactor, and may be rated for the full current and voltage of a load (e.g., a motor) coupled to the power supply 12.

The transformer 16 comprises a core 20 (e.g., an iron core), primary windings 22 magnetically coupled to the core 20, and secondary windings 24 magnetically coupled to the core 20. The primary winding 22 is coupled to the main contactor 14, and the secondary winding 24 is coupled to the power cell 18. Although three primary windings 22 and nine secondary windings 24 are shown in FIG. 1, those skilled in the art will appreciate that the transformer 16 may comprise any number of primary and secondary windings 22, 24.

The power cell 18 may be any type of sub-circuit that converts three-phase AC power into a filtered DC voltage, in which said DC voltage may itself be the output of the power cell 18 or may be further processed by additional sub-circuits within the power cell 18. Although twelve power cells 18 are shown in FIG. 1, those skilled in the art will appreciate that the power supply 12 may include any number of power cells 18, each secondary winding 24 may be coupled to a different power cell 18, and the phase of the voltage applied to one power cell 18 may differ from the phase of the voltage applied to another power cell 18.

Figure 2:
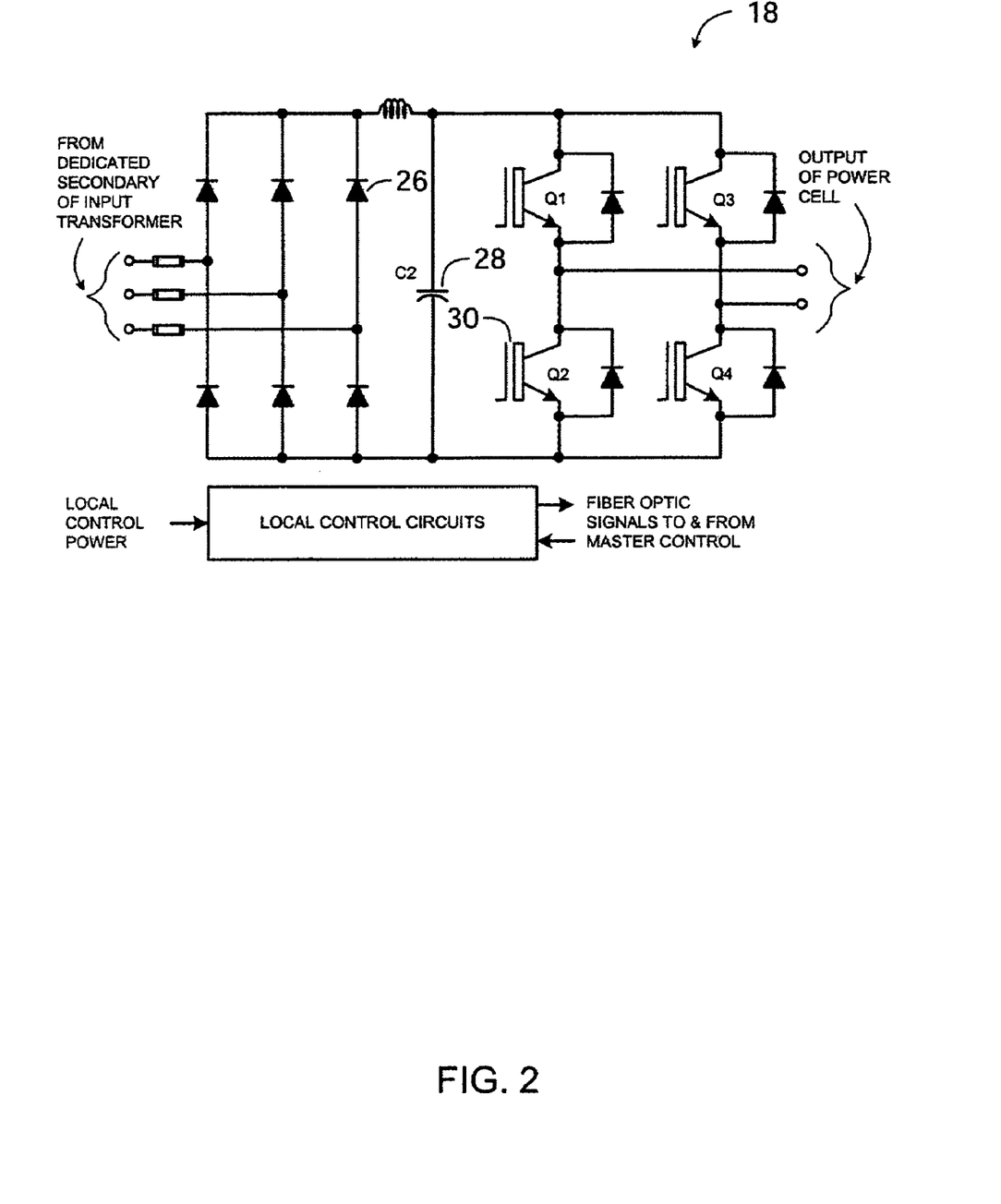
FIG. 2 illustrates various embodiments of a power cell of the power supply of FIG. 1.

FIG. 2 illustrates various embodiments of the power cell 18. The power cell 18 shown in FIG. 2 may be representative of all of the power cells 18 in the power supply 12. The power cell 18 comprises diodes 26 to rectify three-phase power, at least one capacitor 28 to smooth the resulting DC current, and switching devices 30. The power cell 18 may be a power cell as described in U.S. Pat. No. 5,625,545, the contents of which are hereby incorporated by reference in their entirety.

The system 10 comprises a pre-charge circuit 40 connected to three low-voltage AC power lines of a three-phase distribution system, and to one of the secondary windings 24 of the transformer 16 of the power supply 12. The pre-charge circuit 40 comprises a transformer 42, a contactor 44, and impedance elements 46. (e.g., one impedance element for each phase leg).

The transformer 42 may comprise a core (not shown), primary windings (not shown) magnetically coupled to the core of transformer 42, and secondary windings (not shown) magnetically coupled to the core of transformer 42. The primary windings of the transformer 42 are coupled to the three low-voltage AC power lines, and the secondary windings of the transformer 42 are connected to the contactor 44.

The contactor 44 may be a three-phase contactor, and may comprise any number of auxiliary contacts (not shown) as is known in the art. The impedance elements 46 are connected between the contactor 44 and one of the secondary windings 24 of the transformer 16 of the power supply 12. According to various embodiments, the impedance elements 46 may be capacitors, inductors, resistors, or any combination thereof. According to various embodiments, each phase leg may have its own impedance element 46 connected between the contactor 44 and one of the secondary windings 24. According to other embodiments, only two of the phase legs may have their own impedance element 46 connected between the contactor 44 and one of the secondary windings 24.

In operation, low-voltage three-phase AC power is applied to the contactor 44 and the impedance elements 46 to energize one of the secondary windings 24 of the transformer 16. After the capacitors 28 of the power cell 18 have all charged, and after the magnetic flux in the core 20 of transformer 16 has stabilized, the main contactor 14 is closed. Shortly thereafter, the contactor 44 is opened.

When the power supply 12 is operating, the secondary windings 24 of the transformer 16 may carry a large common-mode voltage (referred to ground). To effectively block this common-mode voltage from being passed back to the low-voltage AC power lines connected to the contactor 44, the contactor 44 may be required to be a medium-voltage rated contactor. To ensure that the amplitude and phase of the voltage delivered by the transformer 42 to the secondary winding 24 connected to the impedance elements 46 are the same amplitude and phase of the voltage delivered to the secondary winding 24 by the transformer 16, the transformer 42 may be configured as a low-voltage transformer with medium-voltage isolation and phase-adjust capability. For example, the primary windings of the transformer 42 may be low-voltage rated primary windings, the secondary windings of the transformer 42 may be low-voltage rated secondary windings, and the insulation between the primary and secondary windings may be structured and arranged to block medium-voltage. The transformer 42 may be structured and arranged to adjust its phase shift to accommodate any differences between the three-phase power applied to the contactor 44 and the power applied by the transformer 16 to the secondary winding 24 that is connected to the pre-charge circuit 40.

Figure 3:
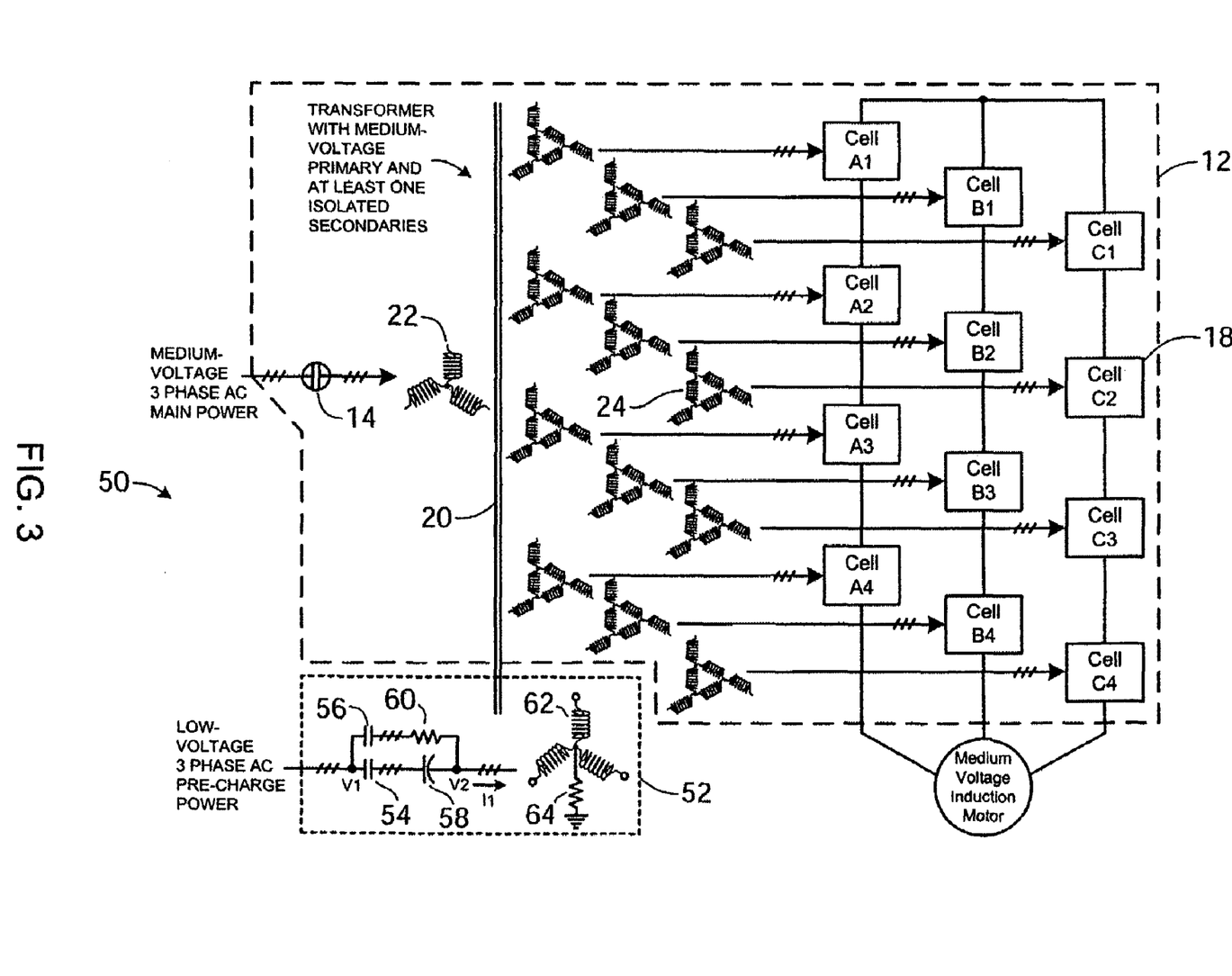
FIG. 3 illustrates various embodiments of a system for limiting AC inrush current to a power supply.

FIG. 3 illustrates various embodiments of a system 50 for limiting AC inrush current to a power supply 12. For purposes of clarity, portions of FIG. 3 are shown in a conventional one-line format. The system 50 comprises a pre-charge circuit 52 connected to a three low-voltage AC power lines of a three-phase distribution system. The pre-charge circuit 52 comprises a first low-voltage contactor 54, a second low-voltage contactor 56, first low-voltage impedance elements 58 (e.g., one first low-voltage impedance element for each phase leg), second low-voltage impedance elements 60 (e.g., one second low-voltage impedance element for each phase leg), and three windings 62.

The first low-voltage contactor 54 may be a three-phase contactor, and may comprise any number of auxiliary contacts (not shown) as is known in the art. The first low-voltage contactor 54 is connected to the three low-voltage AC power lines. The second low-voltage contactor 56 may be a three-phase contactor, and may comprise any number of auxiliary contacts (not shown) as is known in the art. The second low-voltage contactor 56 is connected to the three low-voltage AC power lines.

The first low-voltage impedance elements 58 are connected between the first low-voltage contactor 54 and the windings 62. The second low-voltage impedance elements 60 are connected between the second low-voltage contactor 56 and the windings 62. According to various embodiments, the first low-voltage impedance elements 58 may be capacitors, and the capacitors 58 may be sized to have substantially the same impedance as the magnetizing impedance of the transformer 16. The second low-voltage impedance elements 60 may be resistors, and the resistors 60 may be sized to have an impedance on the order of approximately one-tenth the impedance of the capacitors 58.

According to various embodiments, each phase leg may have its own first low-voltage impedance element 58 and its own second low-voltage impedance element 60 connected to its associated winding 62. For such embodiments, the pre-charge circuit 54 may comprise three first low-voltage impedance elements 58 (one for each phase) and three second low-voltage impedance elements 60 (one for each phase). According to other embodiments, only two of the phase legs may have their own first low-voltage impedance element 58 and their own second low-voltage impedance element 60. For such embodiments, the pre-charge circuit 54 may comprise two first low-voltage impedance elements 58 and two second low-voltage impedance elements 60.

The three windings 62 are magnetically coupled to the core 20 of the transformer 16, and are configured as secondary windings of the transformer 16. As shown in FIG. 3, according to various embodiments, the three windings 62 may be WYE-connected, and the pre-charge circuit 52 may also comprise a resistor 64 connected to a neutral point of the WYE-connected windings 62 and a reference potential (e.g., ground). With the WYE-connection shown in FIG. 3, the system 10 is configured to produce three vectors with 120° of separation.

As each of the components of the pre-charge circuit 52 are low-voltage rated, the components are generally smaller and less expensive than comparable medium-voltage or high-voltage components, do not require any metal clad compartments, and may be packaged with smaller strike and creep distances than comparable medium-voltage and high-voltage components can.

In operation, for embodiments where each phase leg has its own first and second low-voltage impedance elements 58, 60, the first low-voltage contactor 54 is closed, thereby allowing current to pass to the three windings 62 via the first low-voltage impedance elements 58. When the first low-voltage impedance elements 58 are capacitors, the voltage drop across each capacitor 58 may serve to boost the available pre-charge source voltage. This enables the pre-charge process to be completed even if the available pre-charge source voltage is below its nominal value. As the low-voltage 3-phase AC electrical power may be at a frequency of 60 hertz, and the first low-voltage impedance elements 58 may each have a large impedance at the 60 hertz frequency, the first low-voltage impedance elements 58 may serve to limit the initial current passed to the three windings 62 to a relatively small value. Because the three windings 62 and each of the secondary windings 24 are magnetically coupled to the core 20 of the transformer 16, the three windings 62 can pass voltage to the power cells 18 even though none of the three windings 62 are directly connected to any of the power cells 18.

If a fault exists in a circuit of the power supply 12 which prevents achieving full charge on the capacitors 28 of the power cells 18, the limited current flowing through the first low-voltage contactor 54 and the first low-voltage impedance elements 58 will avoid or minimize any further damage. In addition, because the first low-voltage impedance elements 58 are reactive and thus have very low losses, the first low-voltage impedance elements 58 can safely remain connected long enough for the fault to be detected, and the pre-charge process can be aborted.

When the voltage (V2) applied to the three windings 62 becomes substantially equal to the voltage (V1) applied to the first low-voltage contactor 54, the second low-voltage contactor 56 is closed. Closing the second low-voltage contactor 56 effectively shunts the first low-voltage impedance elements 58 with the second low-voltage impedance elements 60 in each phase leg. The resonant circuit formed by the capacitors 58 and the magnetizing inductance of the transformer 16 then becomes overdamped, so that the voltage (V2) applied to the three windings 62 generally holds at the same amplitude as the voltage (V1) applied to the first low-voltage contactor 54. The resulting reduction in impedance serves to reduce the phase error between the voltage (V2) applied to the three windings 62 and the voltage (V1) applied to the first and/or second low-voltage contactors 54, 56. Therefore, the second impedance elements 60 also may serve to ensure that all three phases of the voltage (V2) applied to the three windings 62 are substantially balanced. In addition, the second impedance elements 60 may also serve to ensure that the phase angle of the voltage (V2) applied to the three windings 62 is substantially equal to the phase angle of the voltage (V1) applied to the first low-voltage contactor 54.

After an auxiliary contact of the second low-voltage contactor 56 confirms that the second low-voltage contactor 56 has closed, the first low-voltage contactor 54 is opened, thereby disconnecting the first impedance elements 58 from the low-voltage 3-phase AC power lines. After an auxiliary contact of the first low-voltage contactor 54 confirms that the first low-voltage contactor 54 has opened, the main contactor 14 of the power supply 12 is energized. After an auxiliary contact of the main contactor 14 confirms that the main contactor 14 has closed, the second low-voltage contactor 56 is opened.

Figure 4:
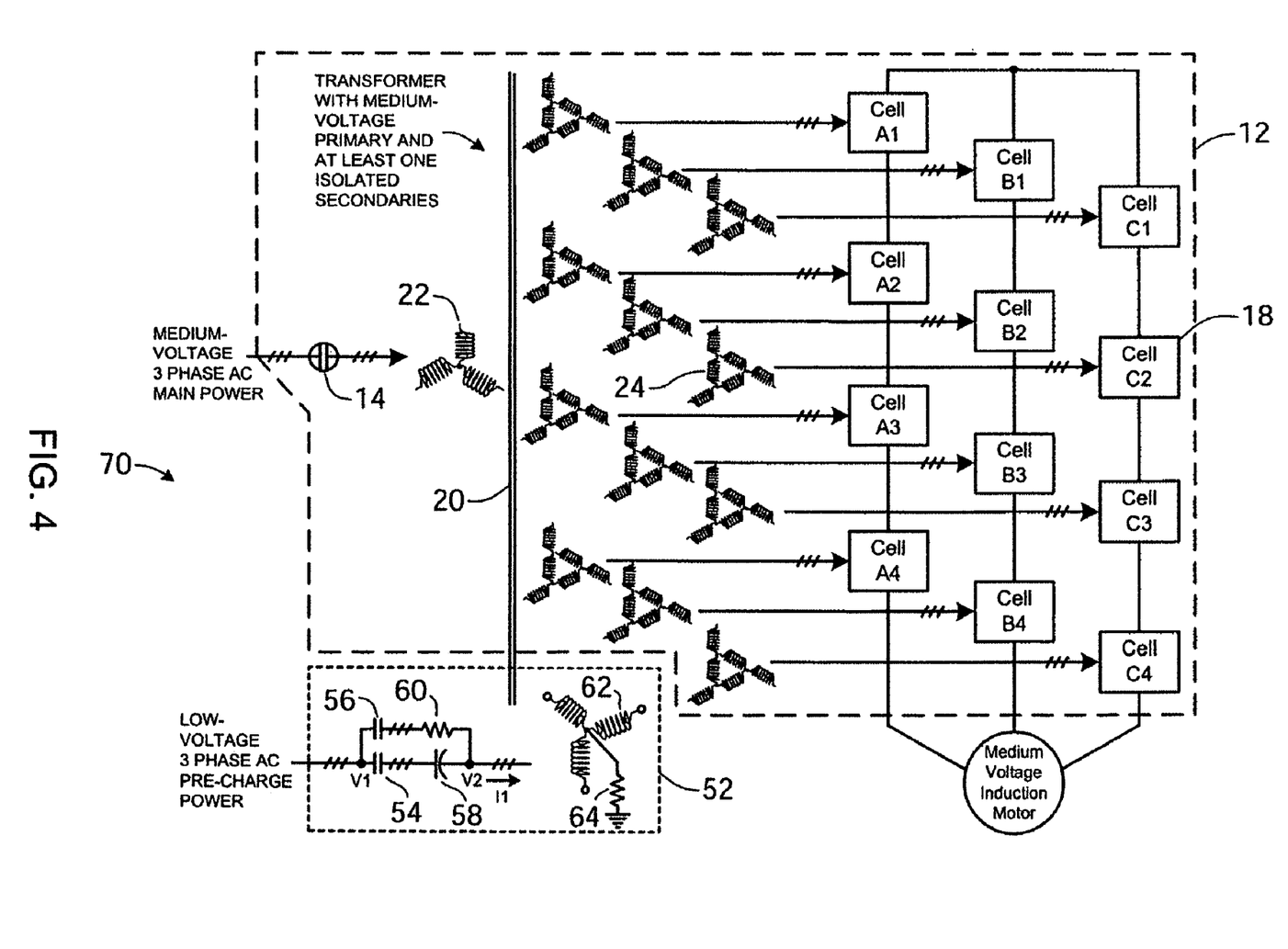
FIG. 4 illustrates various embodiments of a system for limiting AC inrush current to a power supply.

FIG. 4 illustrates various embodiments of a system 70 for limiting AC inrush current to a power supply 12. For purposes of clarity, portions of FIG. 4 are shown in a conventional one-line format. The system 70 is similar to the system 50, but is different in that the three windings 62 are connected in a manner that produces a 180° phase shift as compared to system 50. With this arrangement, the system 70 produces three vectors which are located midway between the vectors produced by the system 50. Therefore, by connecting the windings 62 as shown in FIG. 3 and FIG. 4, six total vectors may be produced on 60° intervals. The phase of the windings 62 can thus be matched to the source of low-voltage 3-phase AC electrical power to within 30°. It is known that if the phase of the voltage on the transformer during the pre-charge period differs significantly from the phase of the voltage on the transformer during normal operation, the sudden change of phase which can occur when the main contactor 14 is closed can cause the transformer to saturate and draw large inrush currents, even though the magnetic flux had previously stabilized. In many applications, a phase match to within 30° is generally sufficient to prevent the transformer from saturating and drawing large inrush currents.

Figure 5:
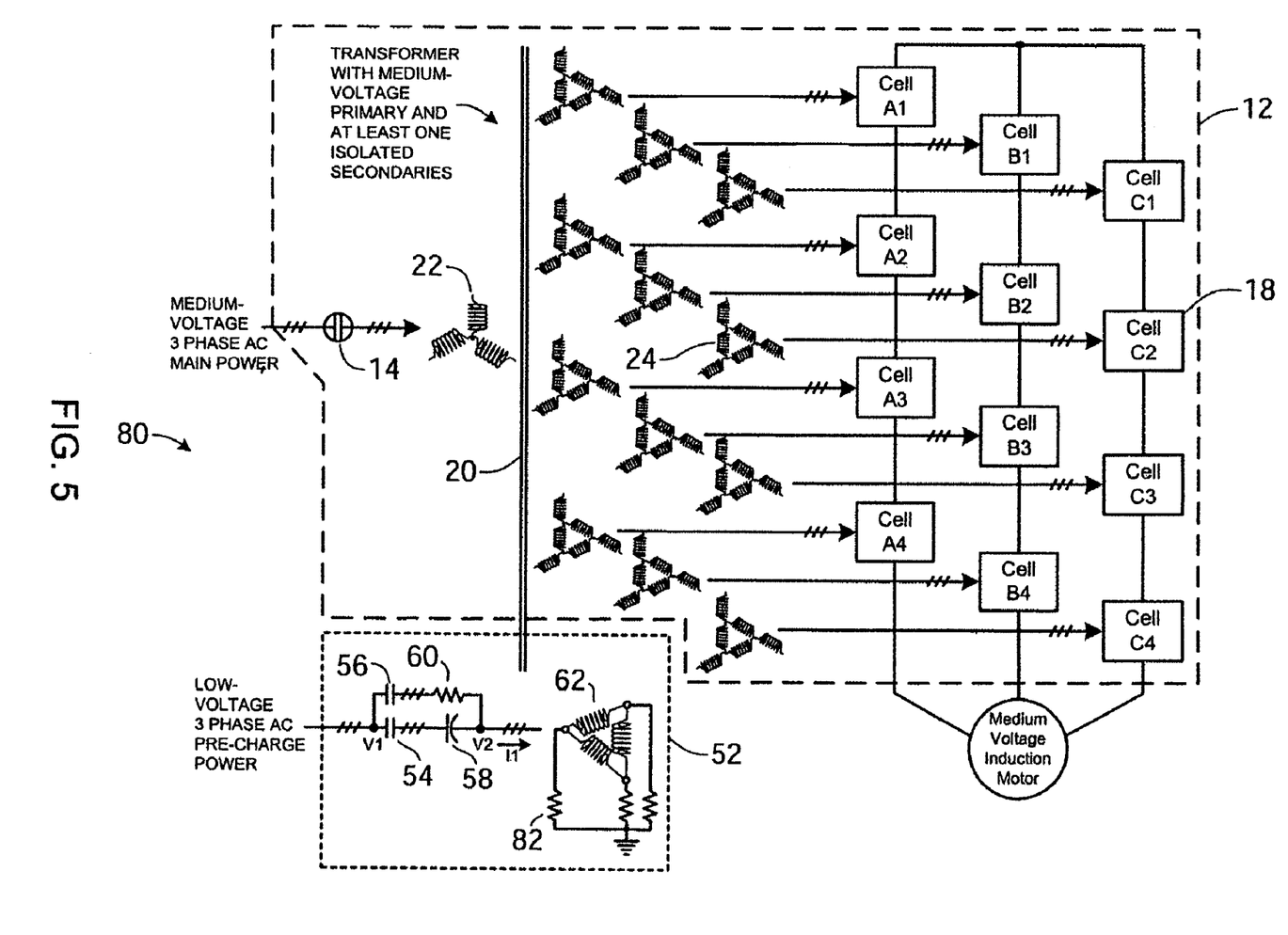
FIG. 5 illustrates various embodiments of a system for limiting AC inrush current to a power supply.

FIG. 5 illustrates various embodiments of a system 80 for limiting AC inrush current to a power supply 12. For purposes of clarity, portions of FIG. 5 are shown in a conventional one-line format. The system 80 is similar to the system 50, but is different in that the three windings 62 are DELTA-connected, and the pre-charge circuit 52 may comprise resistors 82 in lieu of resistor 64. Each resistor 82 is connected to a different node of the DELTA-connected windings 62 and a reference potential (e.g., ground).

Figure 6:
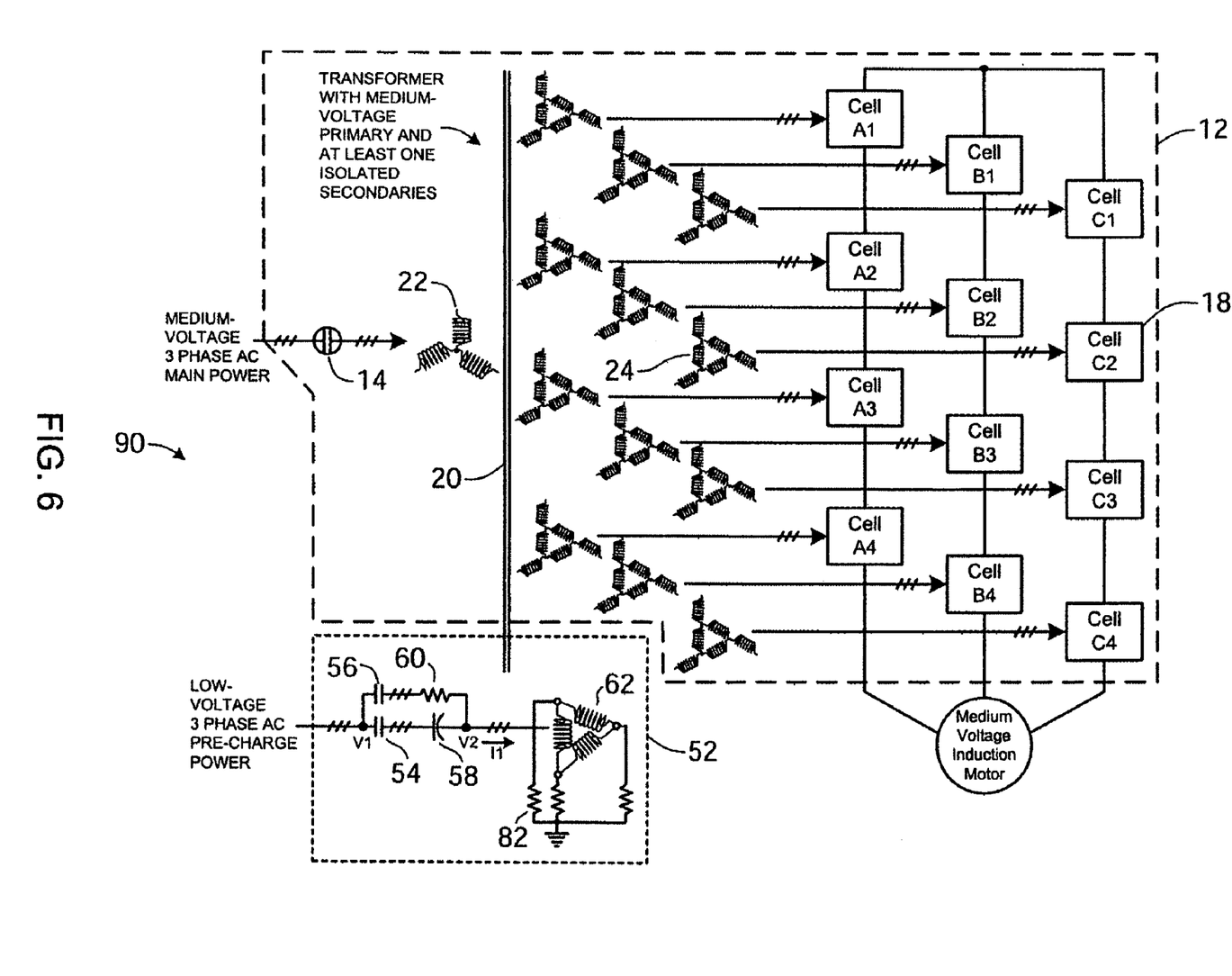
FIG. 6 illustrates various embodiments of a system for limiting AC inrush current to a power supply.

FIG. 6 illustrates various embodiments of a system 90 for limiting AC inrush current to a power supply 12. For purposes of clarity, portions of FIG. 6 are shown in a conventional one-line format. The system 90 is similar to the system 80, but is different in that the three windings 62 are connected in a manner that produces a 180° phase shift as compared to system 80. With this arrangement, the system 90 produces three vectors which are located midway between the vectors produced by the system 80. Therefore, by connecting the windings 62 as shown in FIG. 5 and FIG. 6, six total vectors may be produced on 60° intervals. The phase of the three windings 62 can thus be matched to the source of low-voltage 3-phase AC electrical power to within 30°.

According to various embodiments, if it should be necessary to achieve a phase match better than 30°, the pre-charge circuit 52 may comprise both WYE-connected and DELTA-connected windings 62, or may comprise added taps so that the windings 62 may be connected either in WYE or DELTA. Because the six possible WYE vectors are located midway between the six possible DELTA vectors, such an arrangement would produce a total of twelve vectors on 30° intervals. For such embodiments, the phase of the windings 62 could be matched to the source of low-voltage 3-phase AC electrical power to within 15°.

While several embodiments of the invention have been described herein by way of example, those skilled in the art will appreciate that various modifications, alterations, and adaptations to the described embodiments may be realized without departing from the spirit and scope of the invention defined by the appended claims. For example, three separate low-voltage contactors may be utilized in lieu of the three-phase contactor 54. Similarly, three separate low-voltage contactors may be utilized in lieu of the three-phase contactor 56.

What is claimed is:

1. A system for limiting inrush current to a power supply comprising a transformer having a core, primary windings magnetically coupled to the core, and a plurality of secondary windings magnetically coupled to the core and connected to a plurality of power cells, the system comprising:
   first, second, and third windings, separate from the plurality of secondary windings connected to the plurality of power cells, and magnetically coupled to the core of the transformer of the power supply, the first, second, and third windings dedicated to pre-charging the power supply;
   a first low-voltage contactor;
   a second low-voltage contactor;
   a first low-voltage impedance element connected between the first low-voltage contactor and the first winding;
   a second low-voltage impedance element connected between the second low-voltage contactor and the first winding;
   a third low-voltage impedance element connected between the first low-voltage contactor and the second winding; and
   a fourth low-voltage impedance element connected between the second low-voltage contactor and the second winding.

2. The system of claim 1, wherein the first, second and third windings are configured as secondary windings of the transformer.

3. The system of claim 2, wherein the first, second and third windings are WYE-connected.

4. The system of claim 3, further comprising a resistor connected to a neutral point of the WYE-connected windings and a reference potential.

5. The system of claim 4, wherein the first winding is phase shifted 120° from the second winding, and the second winding is phase shifted 120° from the third winding.

6. The system of claim 2, wherein the first, second and third windings are DELTA-connected.

7. The system of claim 6, further comprising:
   a first resistor connected to the first and second windings;
   a second resistor connected to the second and third windings; and
   a third resistor connected to the first and third windings, wherein the first, second and third resistors are also connected to a reference potential.

8. The system of claim 7, wherein the first winding is phase shifted 120° from the second winding, and the second winding is phase shifted 120° from the third winding.

9. The system of claim 1, wherein the first and third low-voltage impedance elements are capacitors.

10. The system of claim 9, wherein the second and fourth low-voltage impedance elements are resistors.

11. The system of claim 1, further comprising:
    a fifth low-voltage impedance element connected between the first low-voltage contactor and the third winding; and
    a sixth low-voltage impedance element connected between the second low-voltage contactor and the third winding.

12. The system of claim 11, wherein:
    the fifth low-voltage impedance element is a capacitor; and
    the sixth low-voltage impedance element is a resistor.

13. The system of claim 1, further comprising fourth, fifth and sixth windings magnetically coupled to the transformer of the power supply, wherein fifth and sixth low-voltage impedance elements are coupled to one of the fourth, fifth and sixth windings.

14. A method for limiting inrush current to a power supply comprising a transformer having primary windings a plurality of secondary windings magnetically connected to a plurality of power cells, the method comprising:
    charging capacitors of the power supply with low-voltage power delivered via dedicated windings separate from the plurality of secondary winding connected to the plurality of power cells, the dedicated windings magnetically coupled to a transformer of the power supply;
    magnetizing the transformer with low-voltage power delivered via the dedicated windings; and
    applying full voltage to the power supply after the capacitors are charged and the transformer is magnetized.

15. The method of claim 14, wherein charging the capacitors comprises distributing current to the dedicated windings via low-voltage impedance elements.

16. The method of claim 14, wherein magnetizing the transformer comprises distributing current to the dedicated windings via low-voltage impedance elements.

17. The method of claim 14, wherein charging the capacitors and magnetizing the transformer occur concurrently.

18. The method of claim 14, further comprising shunting a first low-voltage impedance element coupled to one of the dedicated windings with a second low-voltage impedance element coupled to the same winding prior to applying full voltage to the power supply.

19. The method of claim 18, wherein shunting comprises shunting a low-voltage capacitor with a low-voltage resistor.

20. The method of claim 14, wherein applying full voltage comprises applying one of the following to the power supply:
    a medium-voltage; and
    a high-voltage.

* * * * *